…

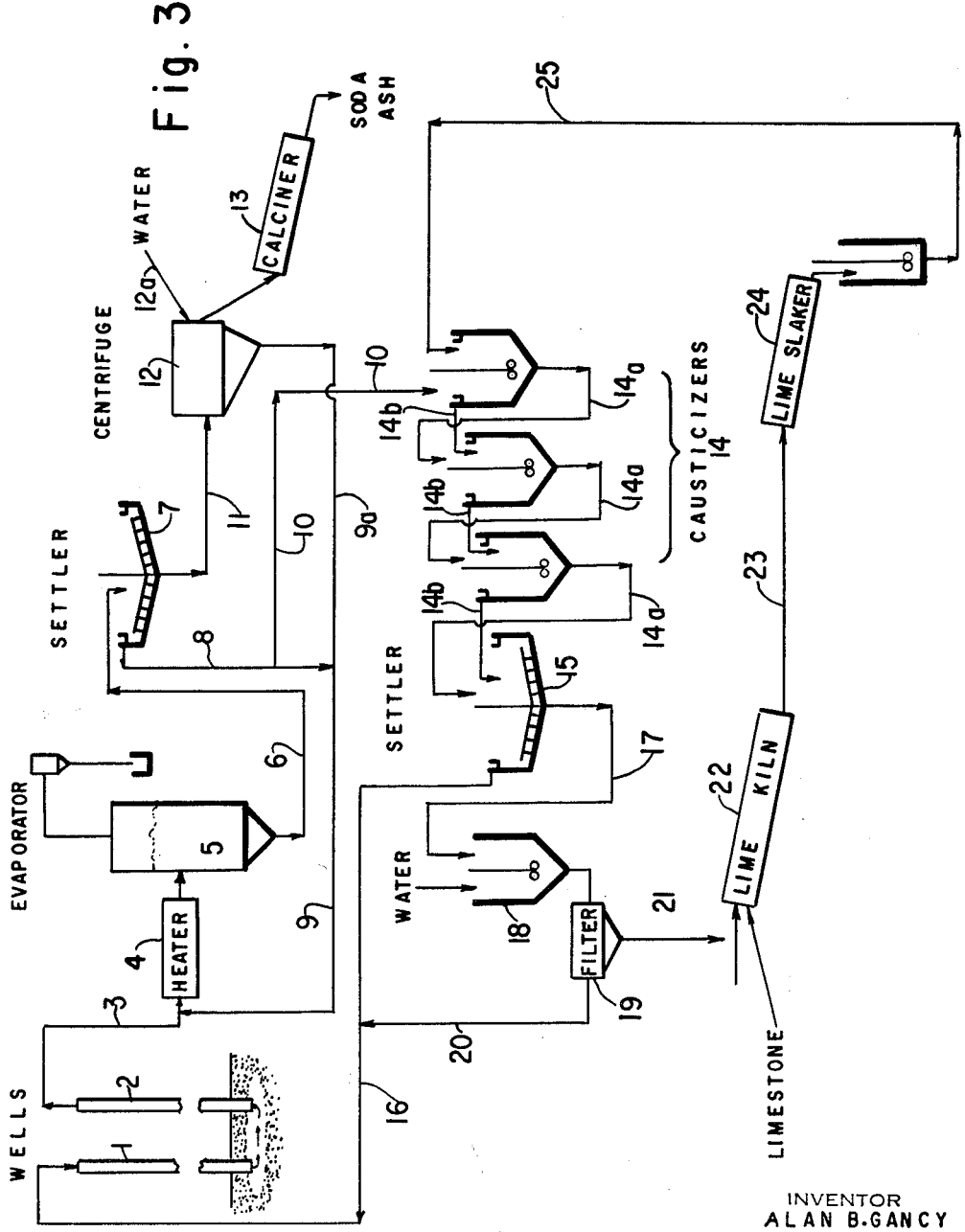

United States Patent Office 3,184,287
Patented May 18, 1965

3,184,287
PROCESS FOR THE PRODUCTION OF SODA ASH FROM UNDERGROUND TRONA DEPOSITS
Alan B. Gancy, Princeton, N.J., assignor to FMC Corporation, New York, N.Y., a corporation of Delaware
Filed Oct. 5, 1961, Ser. No. 143,099
4 Claims. (Cl. 23—63)

The invention relates to a novel process for the production of soda ash from trona as found in Wyoming and other parts of the world.

The trona deposits in southwestern Wyoming are found at a depth of 1200 to 1800 feet underground and consist of a main trona bed varying in thickness from about 8 feet to about 18 feet and other beds of smaller thickness separated by layers of shale. Trona consists mainly of sodium sesquicarbonate $$(Na_2CO_3 \cdot NaHCO_3 \cdot 2H_2O)$$

and 3 to 6% insoluble impurities. A typical analysis of the crude trona is:

|  | Percent |
|---|---|
| $Na_2CO_3$ | 45.0 |
| $NaHCO_3$ | 36.0 |
| $H_2O$ | 15.3 |
| $NaCl$ | 0.04 |
| $Na_2SO_4$ | 0.01 |
| Iron | 0.08 |
| Water insolubles | 3.6 |

The composition of the crude trona corresponds quite closely to that of pure sodium sesquicarbonate except for the impurities present. Shale stringers or beds are present throughout the trona bed and alter the amount of impurities in different parts of the bed.

Solution mining of undeground trona deposits for the purpose of producing soda ash therefrom using water or an unsaturated carbonate brine as the dissolving solvent is old as shown by the Pike Patent No. 2,388,009. The Pike process comprises forcing the heated solvent into the trona formation under pressure to dissolve the trona, withdrawing the pregnant solution, clarifying the solution, crystallizing sodium sesquicarbonate from the solution, calcining the sodium sesquicarbonate to soda ash and heating and recycling the mother liquor to the trona formation to dissolve more trona.

The use of high temperatures and pressures is undesirable due to the increased cost of equipment and the difficulties in raising the temperature of the trona formation from its normal temperature of about 21° C. to a point where the temperature of the exit solution is high enough to contain a sufficient concentration of carbonate for economical recovery.

The dissolving of trona from underground trona deposits with water or an aqueous unsaturated trona solution is further complicated by the formation of a residual dissolution barrier on the exposed surfaces of the underground trona formation. The dissolution barrier decreases the extraction rate of the trona because the barrier effectively increases the thickness of the diffusion path through which solvent diffuses in and trona values diffuse out.

The dissolution barrier is formed by a fairly cohesive network or lacework of trona insolubles in the trona formation, and sodium bicarbonate, from the trona, which redeposits in the laceworks of insolubles. When the trona is dissolved from the exposed trona surfaces with water, a residual network of insoluble material is left on the trona surface. The sodium bicarbonate which is less soluble than the normal sodium carbonate is recrystallized from solution into and onto the residual network and reinforces the network. The insoluble residual network continues to grow in thickness as more trona is leached away and more sodium bicarbonate is deposited, and as the solution approaches saturation the dissolution rate drops off very rapidly.

When the dissolving liquor is an unsaturated carbonate brine of such composition as to dissolve the carbonate and bicarbonate in the trona congruently the quiescent dissolving of trona from underground trona deposits is complicated by the formation of an insoluble residual barrier on the exposed trona surfaces. This barrier, composed of fine insolubles distributed in a more or less homogeneous manner throughout the trona ore, will grow in thickness to a point where it cannot support a further increase in its own weight, at which time the layer thickness becomes stationary. Thus, when trona is dissolved in sodium carbonate solution, the dissolution rate of a freshly cut trona surface will diminish steadily with time, until the stationary barrier thickness is reached, and the dissolution rate levels off.

When trona is not dissolved congruently, as is the case when water is the solvent, the dissolution is further complicated by the deposition or redeposition of sodium bicarbonate crystals upon the dissolving surface. The cohesive layer formed by these fine crystals, and the barrier already present from the trona insolubles, are mutually supporting, and result in a steep drop in the dissolution rate with time. However, instead of reaching a stationary condition, this barrier grows in thickness indefinitely, and eventually results in extremely slow trona extraction.

I have discovered however that if trona is dissolved in sodium hydroxide solutions, the deposition of $NaHCO_3$ upon the dissolving surfaces does not occur due to phase considerations which can be translated simply to mean that $NaHCO_3$ is converted to $Na_2CO_3$ by the action of NaOH:

$$NaOH + NaHCO_3 \rightarrow Na_2CO_3 + H_2O$$

Thus the only barrier now still present is the one composed of the lacework of trona insolubles. I have unexpectedly found, however, that the latter barrier is attacked to a major extent by the caustic solution, resulting in a dissolution rate which does not drop in time to a steady (low) level, but rather drops a short way, and then levels off to maintain a net dissolution or extraction rate over a long period of time which is greater than would be possible if a stable, cohesive layer had been formed.

Thus, aside from possessing other advantages which will hereinafter be pointed out, caustic solution enhances the underground trona extraction rate by (1) preventing the redeposition of $NaHCO_3$, and by (2) attacking the insoluble network inherent in the quiescent dissolution of Wyoming trona, and (3) results in the production of a solution rich in sodium carbonate from which either sodium carbonate monohydrate or anhydrous sodium carbonate may be crystallized for processing into soda ash.

It is therefore an object of this invention to provide a novel solution mining method for the production of soda ash from underground trona deposits using aqueous solution of sodium hydroxide or other alkali having a pH greater than normal sodium carbonate, such as potassium hydroxide, calcium hydroxide and the like to dissolve the trona.

It is a further object of the invention to provide a solution mining method for the production of soda ash from underground trona with aqueous solutions of sodium hydroxide formed by causticization of sodium carbonate solutions.

It is an additional object of the invention to provide a solution mining method for the production of soda ash from underground trona formations without high pressures and temperatures.

Another object of the invention is to produce dense soda ash from underground deposits of trona.

These and other objects and advantages of the invention will become obvious from the following detailed description.

The method of the invention comprises passing an aqueous solution of sodium hydroxide or other suitable alkali having a pH greater than normal sodium carbonate into an underground trona formation whereby the trona is dissolved and the formation of an insoluble sodium bicarbonate dissolution barrier is prevented, withdrawing the pregnant carbonate solution, clarifying the solution, crystallizing the carbonate values from the solution either as sodium carbonate monohydrate or anhydrous sodium carbonate, calcining the carbonate crystals to soda ash, causticizing a portion of the mother liquor containing sodium carbonate with an alkaline earth metal hydroxide whereby alkaline earth carbonate is precipitated and the sodium carbonate is converted to sodium hydroxide, and recycling the sodium hydroxide solution to the underground trona formation to dissolve more trona. As the soda ash is formed from sodium carbonate monohydrate or anhydrous sodium carbonate crystals it is denser than the soda ash formed by calcining sodium sesquicarbonate crystals as described in the Pike Patent No. 2,388,009.

The use of the aqueous sodium hydroxide solution as a solvent prevents the crystallization of sodium bicarbonate from the solution onto the exposed trona surface in which the fine insolubles are distributed because the sodium bicarbonate is converted to sodium carbonate as previously described. Without the re-enforcement of redeposited sodium bicarbonate, the insoluble materials on the exposed trona surface is attacked to a major extent by the caustic solution so that the dissolution rate does not drop off as much as when water or carbonate solutions are used to dissolve the trona and a higher dissolution rate may be maintained.

Another advantage of the use of aqueous sodium hydroxide as the solvent in the solution mining method herein described is that a high concentration of sodium carbonate in the well exit solution can be obtained without the need for high temperatures. For example, if the inlet solution temperature is 35 to 45° C. and the exit temperature is 30° C., the well exit solution will contain 27% or higher sodium carbonate. The use of lower inlet and outlet temperatures reduces the underground heat losses and reduces the time required to heat the underground trona formation to operating temperatures. The lower temperatures also reduce the solution rate of organic and inorganic impurities contained in the shale stringers and therefore, the amount of organic contaminants in the solution is reduced.

Another advantage of the use of sodium hydroxide as a solvent for the trona is that the reaction

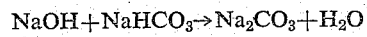

is exothermic so that the face of the trona at the point of solution is heated up to some extent, thereby facilitating dissolution and attack on the trona insoluble layer and the water produced by the reaction reduces the amount of water which must otherwise be provided to dissolve the trona.

The production of a well exit solution having a high concentration of sodium carbonate reduces the amount of water which must be evaporated to crystallize sodium carbonate therefrom. The primary crystal product from the crystallization step is sodium carbonate monohydrate which can be washed to remove any inorganic salt impurities and then be calcined to obtain a dense soda ash. If the evaporation is carried out at temperatures in excess of 106° C. and superatmospheric pressure, anhydrous sodium carbonate may be produced.

A portion of the sodium carbonate mother liquor from the crystallization may be causticized to convert the carbonate solution to hydroxide solution according to the following equation:

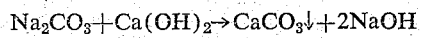

Instead of calcium hydroxide, other alkaline earth metal hydroxides such as barium hydroxide may be used. The precipitated calcium carbonate is washed and then calcined to calcium oxide which is then slaked and used for causticization of another batch of mother liquor preferably in a continuous causticization process. Therefore, the system only requires small additional amounts of calcium oxide to replace that lost during normal handling.

In the accompanying drawings—

FIGURE 3 is a flow sheet of a preferred embodiment of the process of producing soda ash according to the invention.

Figure 1:
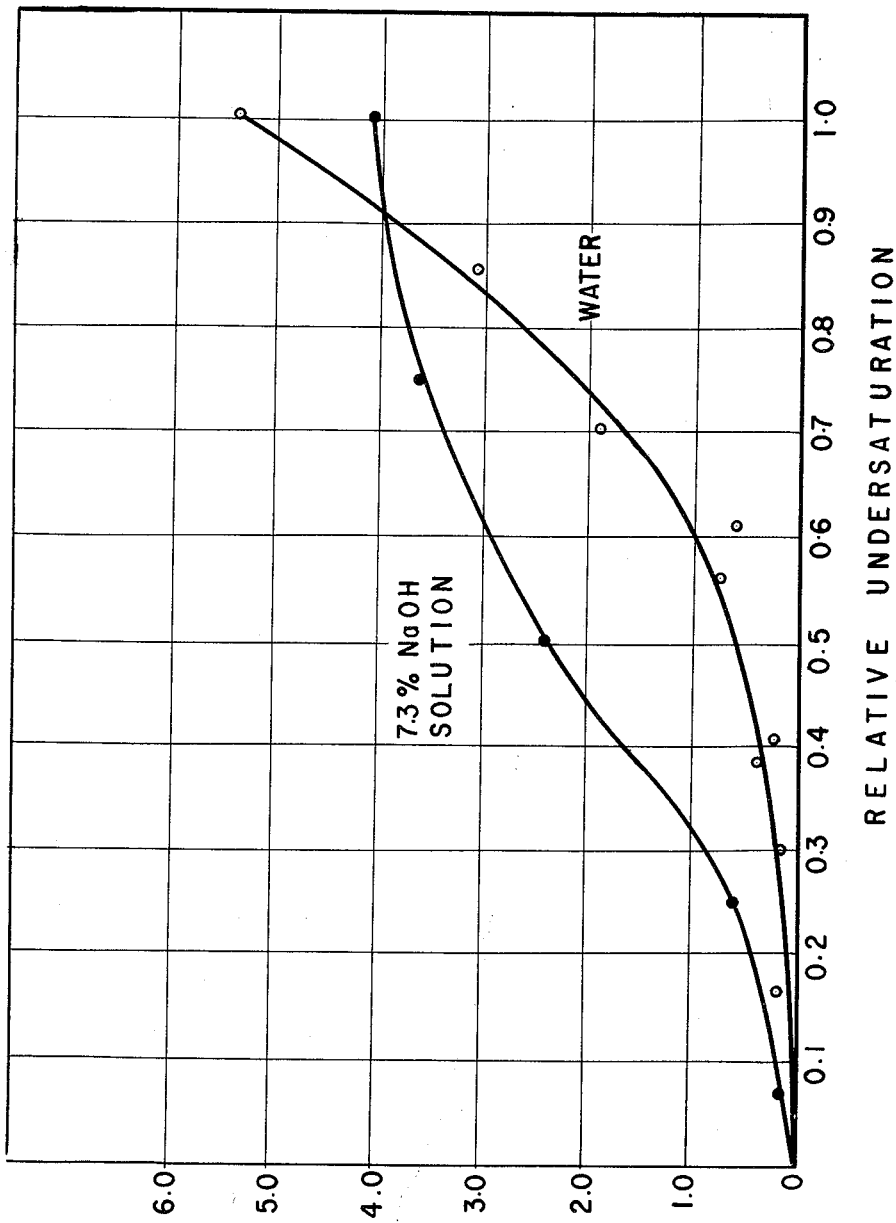
FIGURE 1 is a graph showing the rate of dissolution versus relative trona undersaturation curves for water and aqueous sodium hydroxide solutions.

The graph in FIGURE 1 was plotted from dissolution rates obtained in a point-wise fashion at a constant temperature of 30° C. In the graph the abscissas represents the relative undersaturation reading from 0.0 undersaturation (complete saturation) on the left to 1.0 undersaturation (complete unsaturation) on the right and the ordinates represent the specific trona dissolution rate in milligrams per minute per square centimeter at 30° C.

It can be clearly seen from the curves of FIGURE 1 that water has a higher initial dissolution rate for trona than a sodium hydroxide solution, but at about 90% undersaturation (10% saturation) the curve for the water dissolution rate falls below the curve for the sodium hydroxide dissolution rates and as complete saturation (0.0 undersaturation) is approached the rate of water solution falls very low. At about 0.5 undersaturation (50% saturation) the rate of water solution has fallen below a tolerable rate for solution mining, whereas the rate of solution in sodium hydroxide solutions remains relatively high and continues at a relatively high rate with reference to a water solution until nearly complete saturation is reached. This graph shows the distinct advantages which the higher dissolution rates of sodium hydroxide solutions have, over water solutions, for the solution mining of underground trona deposits.

Figure 2:
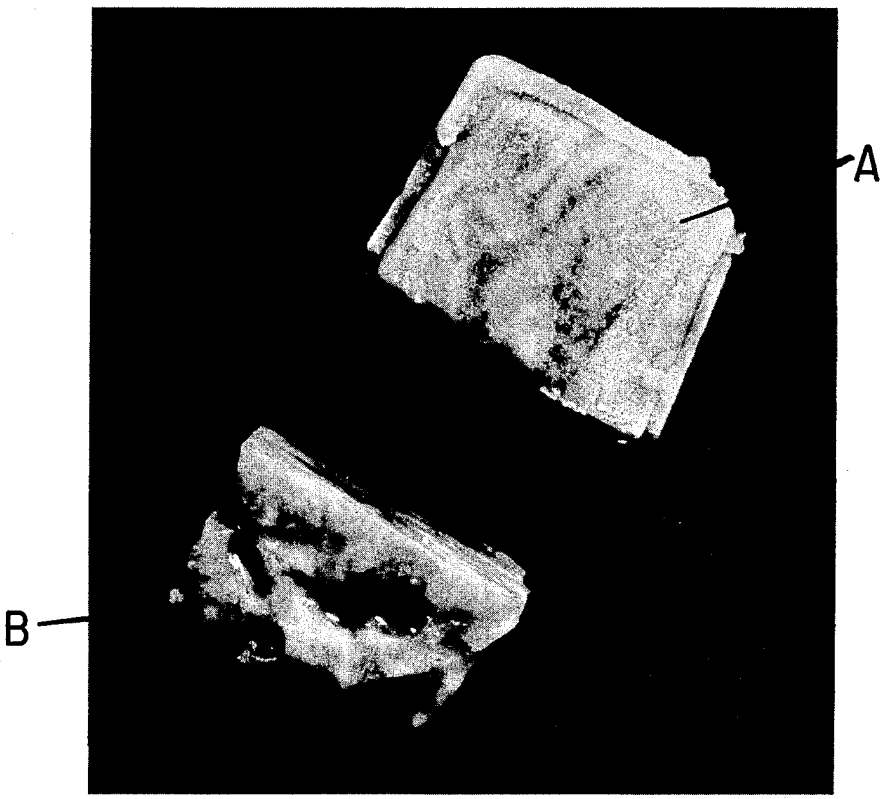
FIGURE 2 is a microphotograph comparing two samples of trona after 21 hours of dissolution with a water solution and a 7.3% sodium hydroxide solution.

FIGURE 2 shows two trona cubes after treatment with dissolving solutions. A one inch cube A of trona was suspended in 65 cc. of distilled water in 250 cc. beaker so that the water covered the trona cube and the solution was held at 30° C. for 17 hours. A second one inch trona cube B was treated in a similar manner except that 65 cc. of a 7.3 weight percent solution of sodium hydroxide was used in place of 65 cc. of distilled water. The sides of the cubes facing each other are the sides which rested on the bottom of the beakers.

FIGURE 2 shows that much more trona was dissolved from cube B than from cube A. The insoluble dissolution barrier discussed above is visible around the edges of cube A while cube B is free of an insoluble dissolution barrier.

The reaction of the sodium hydroxide with the sodium bicarbonate liberates some heat which has the effect of warming the dissolving face, whereas when water or sodium carbonate mother liquir is used for dissolving trona, heat is absorbed, which has the effect of chilling the dissolving face.

In the embodiment of the invention illustrated by FIGURE 3 the aqueous sodium hydroxide is passed down well 1 to the underground trona formation and through the trona formation to well 2 to dissolve the trona and the pregnant carbonate solution is brought to the surface via well 2. The wells 1 and 2 are preferably connected by a fracture in the trona formation although they may be connected by other methods or single unconnected wells may be used. The pregnant carbonate solution is passed by line 3 to heater 4 and after heating is passed to evaporator 5 wherein sufficient water is evaporated to form a slurry of sodium carbonate monohydrate crystals and aqueous sodium carbonate or of anhydrous sodium carbonate crystals if the evaporator 5 is operated at superatmospheric pressure and a temperature about 106° C.

The crystal slurry is removed from the evaporator 5 through line 6 and is fed to settler 7 wherein the sodium carbonate monohydrate crystals settle to the bottom and the mother liquor is removed as an overflow via line 8. Part of the mother liquor is recycled to heater 4 by line 9 and part of the mother liquor is taken through line 10 for use in the causticizers 14. The monohydrate crystals from the settler 7 are passed by line 11 to the centrifuge 12 where the residual mother liquir is removed from the said crystals and the crystals are washed by wash water from line 12a. The residual mother liquor and the wash water is added to the recycled mother liquor from the settler 7 through the line 9a and flowed back to the heater 4. The monohydrate crystals are removed from the centrifuge 12 to the calciner 13 wherein the sodium carbonate monohydrate crystals are converted to dense soda ash.

The portion of mother liquor flowing through line 10 from the settler 7 is mixed with slaked lime in causticizers 14 wherein the sodium carbonate mother liquor is converted to aqueous sodium hydroxide and insoluble calcium carbonate by the action of the slaked lime. The resulting mixture is fed to a settler 15 wherein insoluble calcium carbonate settles to the bottom and the sodium hydroxide solution is removed as an overflow by line 16 and is sent back through the well circuit 1–2 to dissolve more underground trona.

The insouluble calcium carbonate is removed as a mud from the settler 15 via line 17 to a stirring vessel 18 wherein the mud is washed with water to remove any residual sodium values. The washed muds are filtered in filter 19 with the washwater filtrate being added to the sodium hydroxide solution via line 20 and the washed calcium carbonate muds are taken by conveyor 21 to the lime kiln 22 wherein the calcium carbonate is calcined to calcium oxide. Limestone is added to the kiln 22 to replace calcium lost during the causticization. The calcium oxide is then conveyed by conveyor 23 to the lime slaker 24 wherein the calcium oxide is slaked to calcium hydroxide. The calcium hydroxide slurry is conveyed by line 25 to the causticizers 14. In the causticizers 14 the slaked lime is thoroughly mixed with the sodium carbonate solution from line 10 preferably in a series of causticizer tanks 14 in which the slurry of solids is removed from the bottom of one tank and pumped to the top of the next tank in the series through the lines 14a and the liquid overflowing from the top of one tank flows into the next tank in the series through the lines 14b.

The strength of the sodium hydroxide solution used to dissolve the trona is not critical and can vary within wide limits. For best results it is preferable to use solutions having between 3% and 10% NaOH. Solutions containing 3.3% NaOH to 7.3% NaOH have been found particularly good. The temperature of the solution feed into the wells may vary from 0° C. to 105° C., but it is desirable that the temperature of the solution be equal to or above the temperature of the trona formation which is 21.5° C.

*Example*

In the following example the rate of material flow for producing 300,000 tons of soda ash per year in the plant described in FIGURE 3 is shown. The reference numerals in the tables correspond to the reference numerals in FIGURE 3.

| Ref. | Description | Pounds per hour for 300,000 tons per year (8,000 operating hours) | | | | |
|---|---|---|---|---|---|---|
| | | $NaCO_3$ | NaCl | $H_2O$ | Total | $Ca(OH)_2$ $CaCO_3$ CaO |
| 3 | Well brine | 106,600 | 10,260 | 278,140 | 395,000 | |
| 9 | Recycle filtrate | 92,700 | 28,200 | 282,100 | 403,000 | |
| 9a | Wash liquor from centrifuge | 7,020 | 514 | 16,900 | 24,434 | |
| 4 | Evaporator feed | 206,320 | 38,974 | 577,140 | 822,434 | |
| 5 | Water evaporated | | | 178,900 | 178,900 | |
| 9 | Recycle filtrate | 92,700 | 28,200 | 282,100 | 403,000 | |
| 10 | Filtrate to causticizers | 31,690 | 10,110 | 97,300 | 139,100 | |
| 12 | Wet monohydrate cake | 81,930 | 664 | 18,840 | 101,434 | |
| 6 | Evaporated products | 206,320 | 38,974 | 577,140 | 822,434 | |
| 12 | Wet monohydrate cake | 81,930 | 664 | 18,840 | 101,434 | |
| 12 | Wash water | | | 15,550 | 15,550 | |
| 9a | Wash liquor from centrifuge | 7,020 | 514 | 16,900 | 24,434 | |
| 12 | Washed cake | 74,910 | 150 | 17,490 | 92,550 | |
| 13 | $H_2O$ evaporated in calciner | | | 17,490 | 17,490 | |
| 13 | Soda ash | 74,910 | 150 | | 75,060 | |
| 10 | Filtrate to causticizers | 31,690 | 10,110 | 97,300 | 139,100 | |
| 25 | Lime slurry | | 95 | 59,800 | 81,995 | [1] 22,100 |
| 14 | Causticizer effluent | [2] 23,900 | 10,205 | 157,100 | 221,095 | [3] 29,890 |
| 18 | Wash water in settler | | | 170,710 | 170,710 | |
| 21 | Washed sludge | | | 29,890 | 59,780 | [3] 29,890 |
| 16 | Well solvent | { [2] 23,900 [2] 23,900 | } 10,205 | 297,920 | 332,025 | |
| 1-2 | Trona dissolved | 126,600 | | 32,250 | 134,950 | |
| 1-2 | NaCl dissolved | | 1,975 | | 1,975 | |
| 1-2 | Total underground soln | 126,600 | 12,180 | 330,170 | 468,950 | |
| 1-2 | Remaining underground | 20,000 | 1,920 | 52,030 | 73,950 | |
| 3 | Well brine | 106,600 | 10,260 | 278,140 | 395,000 | |
| 21 | Washed sludge | | | 29,890 | 59,780 | [3] 29,890 |
| 23 | Calcined sludge | | 95 | | 16,825 | [4] 16,730 |
| 24 | Water added to slaker | | | 65,170 | 65,170 | |
| 25 | Lime slurry | | 95 | 59,800 | 81,995 | [1] 22,100 |

[1] $Ca(OH)_2$.  [2] NaOH.  [3] $CaCO_3$.  [4] CaO.

While sodium hydroxide is the preferred dissolving solution for reasons of economy and because it does not introduce another anion into the soda ash recovery process, other alkali solutions such as potassium hydroxide, calcium hydroxide, etc., could be used in the process described, and likewise in place of calcium hydroxide other causticizing agents such as barium hydroxide may be used.

Various modifications of the process of the invention may be made without departing from the spirit or scope thereof, and it is to be understood that the invention be limited only as defined in the appended claims.

I claim:

1. A method for preventing the formation of an insoluble dissolution barrier on the face of an underground trona deposit subjected to in situ solution mining and for the preparation of soda ash from trona solutions which comprises passing an aqueous solution of an alkali having a pH greater than sodium carbonate into an underground trona formation and along the face of the trona deposit, dissolving trona in situ from the exposed face of the deposit and preventing the formation of an insoluble dissolution barrier along the face of the deposit by use of said alkali in the dissolving solution to convert the sodium bicarbonate in the trona to a normal alkali carbonate and prevent the redeposition of sodium bicarbonate in the lattice network of insoluble material formed on the face of the trona deposit undergoing solution, withdrawing the pregnant carbonate solution from the underground formation, crystallizing sodium carbonate values from the solution, separating the crystals from the mother liquor, calcining the carbonate crystals to soda ash, adding an alkaline earth metal hydroxide to a portion of said mother liquor containing sodium carbonate whereby an alkaline earth metal carbonate is precipitated and the sodium carbonate is converted to sodium hydroxide and recycling the sodium hydroxide solution to the underground trona formation to dissolve more trona.

2. A method for preventing the formation of an insoluble dissolution barrier on the face of an underground trona deposit subjected to in situ solution mining and for the preparation of soda ash from trona solutions, which comprises passing an aqueous solution of sodium hydroxide into an underground trona formation and along the face of the trona deposit, dissolving trona in situ from the exposed face of the deposit and preventing the formation of an insoluble dissolution barrier along the face of the deposit by use of said sodium hydroxide in the dissolving solution to convert the sodium bicarbonate in the trona to sodium carbonate and prevent the redeposition of sodium bicarbonate in the lattice work of insoluble material formed on the face of the trona deposit undergoing solution, withdrawing the pregnant carbonate solution from the underground formation, crystallizing sodium carbonate values from the solution by evaporation, separating the carbonate crystals from the mother liquor, calcining the carbonate crystals to soda ash, adding an alkaline earth metal hydroxide to a portion of said mother liquor containing sodium carbonate whereby the sodium carbonate is converted to sodium hydroxide and an alkaline earth metal carbonate is precipitated from the solution, separating the precipitate from the solution and recycling the sodium hydroxide solution to the underground trona formation to dissolve more trona, calcining the precipitated alkaline earth metal carbonate to the corresponding oxide, hydrating the said oxide to the alkaline earth metal hydroxide and adding said hydroxide to a portion of the mother liquor.

3. The process of claim 2 wherein the alkaline earth metal is calcium.

4. The process of claim 2 wherein said aqueous solution of sodium hydroxide contains between about 3 and about 10% NaOH.

References Cited by the Examiner

UNITED STATES PATENTS

| | | | |
|---|---|---|---|
| 1,759,361 | 5/30 | Miller et al. | 23—40 |
| 1,994,892 | 3/35 | MacMullin et al. | 23—40 X |
| 2,388,009 | 10/45 | Pike | 23—38 |
| 2,685,438 | 8/54 | Cross | 23—40 X |

MAURICE A. BRINDISI, *Primary Examiner.*

GEORGE D. MITCHELL, *Examiner.*